United States Patent [19]
Suh

[11] Patent Number: 5,805,244
[45] Date of Patent: Sep. 8, 1998

[54] LIQUID CRYSTAL PROJECTOR USING A MONOCHROMATIC LIQUID CRYSTAL DISPLAY

[75] Inventor: Inh-Seok Suh, Kyounggi-do, Rep. of Korea

[73] Assignee: Samsung Aerospace Industries, Ltd., Kyeongsangnam-do, Rep. of Korea

[21] Appl. No.: 763,898

[22] Filed: Dec. 11, 1996

[30] Foreign Application Priority Data

Dec. 11, 1995 [KR] Rep. of Korea ............... 95-48398

[51] Int. Cl.⁶ .................. G02F 1/1335; G03B 21/26; G03B 21/14
[52] U.S. Cl. .................. 349/7; 349/8; 353/34; 353/49; 353/82
[58] Field of Search ................. 349/7, 8; 353/34, 353/49, 82

[56] References Cited

U.S. PATENT DOCUMENTS 4,368,963 1/1983 Stolov ............................... 349/8
4,864,390 9/1989 McKechnie et al. ............... 353/34
5,179,398 1/1993 Iizuka ............................... 353/34

FOREIGN PATENT DOCUMENTS 6-75200 3/1994 Japan ............................... 349/7

*Primary Examiner*—Anita Pellman Gross
*Attorney, Agent, or Firm*—Finnegan, Henderson, Farabow, Garrett & Dunner, L.L.P.

[57] ABSTRACT

A liquid crystal projector using monochromatic liquid crystal displays (LCDs). The liquid crystal projector includes a filter for filtering light emitted from a light source and for outputting a white light. A condenser lens group then condenses the white light, and, thereafter, the condensed white light is separated into the three primary colors of light by (color filters and applied to an LCD part comprising monochromatic LCDs. The LCD part outputs video images corresponding to the three primary colors of light separated according to an applied video signal. A reflective part their combines the outputted video images and outputs the combined video image to a projector lens. Finally, the projector lens projects the combined video image onto a screen.

10 Claims, 3 Drawing Sheets

LIQUID CRYSTAL PROJECTOR USING A MONOCHROMATIC LIQUID CRYSTAL DISPLAY

BACKGROUND OF THE INVENTION

A. Field of the Invention

The present invention relates to a liquid crystal projector. More particularly, the present invention relates to a liquid crystal projector using a monochromatic LCD (liquid crystal display).

B. Description of the Prior Art

Generally, a liquid crystal projector is a device for displaying a video image on a screen. This is done by transmitting a white light onto a liquid crystal from the rear of the liquid crystal. The video image formed within the liquid crystal is then projected onto the screen by using an electric signal. Conventionally, a liquid crystal projector uses three liquid crystal displays in order to obtain a clear video image. Three displays are used since the resolution of one liquid crystal display is not high enough for an enlarged screen.

The operation of a conventional liquid crystal projector, using a black and white liquid crystal display (LCD), will now be explained with reference to FIG. 1. As shown in the block diagram of FIG. 1, the prior art liquid crystal projector using a black and white LCD includes a lamp 1 and a filter 2. The filter 2 filters the light from the lamp and outputs a white light to a first reflective part 3. A condenser lens group 4 condenses the light reflected from the first reflective part 3 as red, green and blue components. An LCD part 5 then outputs a corresponding video image by modulating condensed light components according to a video applied to the LCD part 5. A second reflective part 6 combines the modulated light components received from the LCD part E into a combined video image. Finally, a projector lens 12 projects the combined video image onto a screen (not shown).

The first reflective part 3 further includes three dichroic mirrors 31, 33, and 35. The first dichroic mirror 31 reflects only a red light component received from the filtered white light, while transmitting the other optical components to mirror 33. The second dichroic mirror 33 reflects only a blue light component received from the optical components which were passed through the first dichroic mirror 31, and transmits the other optical components to mirror 35. The reflective mirror 35 then reflects a green light component received from the optical components which were passed through the second dichroic mirror 33.

The condenser lens group 4 further includes three condenser lenses 41, 43 and 45. The first condenser lens 41 condenses the incident red light which was reflected from the first reflective part 3. Similarly, the second condenser lens 43 condenses the incident blue light which was reflected from the first reflective part 3. Finally, the third condenser lens 45 condenses the incident green light which was also reflected from the first reflective part 3.

The LCD part 5 is made of black and white LCDs, and further includes three LCD parts 51, 53 and 55. The first LCD 51 outputs a red video image by modulating the red light beam outputted from the condenser lens group 4 according to a video signal applied to the LCD part 5. Similarly, the second LCD 53 outputs a blue video image by modulating the blue light beam outputted from the condenser lens group 4 according to the applied video signal. Finally, a third LCD 55 outputs a green video image by modulating the green light beam outputted from the condenser lens group 4 according to the applied video signal.

The second reflective part 6 further includes three mirrors 61, 63, and 65. Namely, a second reflective mirror 61 is provided for reflecting the red video image outputted from the LCD part 5. In addition, a third dichroic mirror 63 which reflects the blue video image, and a fourth dichroic mirror 65 which reflects the green video image, are provided in the second reflective part 6. Finally, the projector lens 12 combines all of the video images reflected by the second reflective part 6 and projects a corresponding color video signal onto the screen.

In the prior art projector described above, the light emitted from the lamp 1 is converted into white light when it passes though the filter 2. This white light then becomes incident on the first dichroic mirror 31 of the first reflective part 3. A dichroic mirror is a special reflective mirror that reflects colors of light within a predetermined wavelength range, while at the same time allowing other colors of light outside of the wavelength range to be passed through it.

Thus, from the white light which is incident on the first dichroic mirror 31, only the red light component is reflected and becomes incident on the first condenser lens 41. Similarly, the light components of the other wavelengths are transmitted through the dichroic mirror 31 and become incident onto the second dichroic mirror 33. Of the two light components which are then incident on the second dichroic mirror 33, only the blue light component is reflected and becomes incident on the second condenser lens 43. As a result, only the green light component is transmitted through the dichroic mirror 33 and then reflected by the reflective mirror 35. The light component reflected by the mirror 35 then becomes incident on the third condenser lens 45.

The first condenser lens 41 outputs only a red video image to the second reflective mirror 61 by condensing the red light reflected from the first dichroic mirror 31 onto the first LCD 51. The LCD 51 then modulates this light according to the applied video signal. Similarly, the second condenser lens 43 condenses the blue light onto the second LCD 53 which outputs the blue video image to the third dichroic mirror 63. Finally, the third condenser lens 45 condenses the green light onto the third LCD 55 which outputs the green video image to the fourth dichroic mirror 65.

The red video image outputted to the second reflective mirror 61 is reflected and becomes incident onto the third dichroic mirror 63. The third dichroic mirror 63 transmits the red video image reflected from the second reflective mirror 61 and reflects the blue video image outputted from the second LCD 53, thereby outputting the combined red and blue video images to the fourth dichroic mirror 65. The fourth dichroic mirror 65 transmits the combined red and blue video images reflected from the third dichroic mirror 65, and reflects the green video image outputted from the third LCD 55, thereby outputting the combined red, blue, and green video images to the projector lens 12. Accordingly, the projector lens 12 projects the combined red, blue and green color video images onto the screen.

In the prior part liquid crystal projector using a black and white LCD, two dichroic mirrors and one reflective mirror are used to separate the white light. In addition, two more dichroic mirrors and another reflective mirror are each used to combine the color video images. Accordingly, the prior art liquid crystal projector using a black and white LCD has disadvantages in that its manufacturing cost is high since a plurality of dichroic mirrors, which are expensive, are used. In addition, the projector has a complex construction and a large size since the plurality of dichroic mirrors and reflective mirrors are used.

SUMMARY OF THE INVENTION

An important principle advantage of the present invention is the provision of an arrangement which substantially obviates one or more of the limitations and disadvantages of the described prior art arrangements. In particular, the present invention is directed to a liquid crystal projector using a monochromatic liquid crystal display (LCD) which is both inexpensive and small in size.

Additional features and advantages of the invention will be set forth in the description which follows, and in part will be obvious from the description, or may be learned by practice of the invention. The objectives and other advantages of the invention may be realized and attained by the apparatus particularly pointed out in the written description and claims hereof, as well as the appended drawings.

To achieve these and other advantages and in accordance with the purpose of the invention, as embodied and broadly described, the invention comprises a liquid crystal projector. Included in the projector is a light source for outputting a light, and a filtering means which filters the light outputted from the light source and which outputs a white light. A condenser means condenses the white light outputted from the filtering means and outputs a condensed white light. Also included is a LCD means which comprises a plurality of monochromatic LCDs. Each of these LCDs includes a color filter for filtering the condensed white light. The LCD means then outputs video images by modulating the condensed white light outputted from the condenser means according to a video signal applied to the LCD means. A reflective means then combines each video image outputted from the LCD means and outputs a combined color video image. Finally, a projecting means projects the combined color video image outputted from the reflective means onto a screen.

According to another aspect of the present invention, the liquid crystal projector comprises a light source for outputting a light, and a filtering means which filters the light outputted from the light source and which outputs a white light. A first condenser means condenses the white light outputted from the filtering means and outputs a condensed white light. Also included is a LCD means having red, green, and blue color filters for filtering the condensed white light. These color filters then output a red video image, a blue video image, and a green video image by modulating the condensed white light outputted from the condenser means according to a video signal applied to the CD means. Next, a second condenser means condenses the red video image, the blue video image and the green video image from the LCD means and outputs respective condensed video images. A reflective means combines the red, blue, and green condensed video images outputted from the second condenser means and outputs a combined color video image. Finally, a projecting means projects the combined color video image outputted from the reflective means onto a screen.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate embodiments of the invention and, together with the description, serve to explain the objects, advantages, and principles of the invention. In the drawings.

DESCRIPTION OF THE PREFERRED EMBODIMENTS

Figure 1:
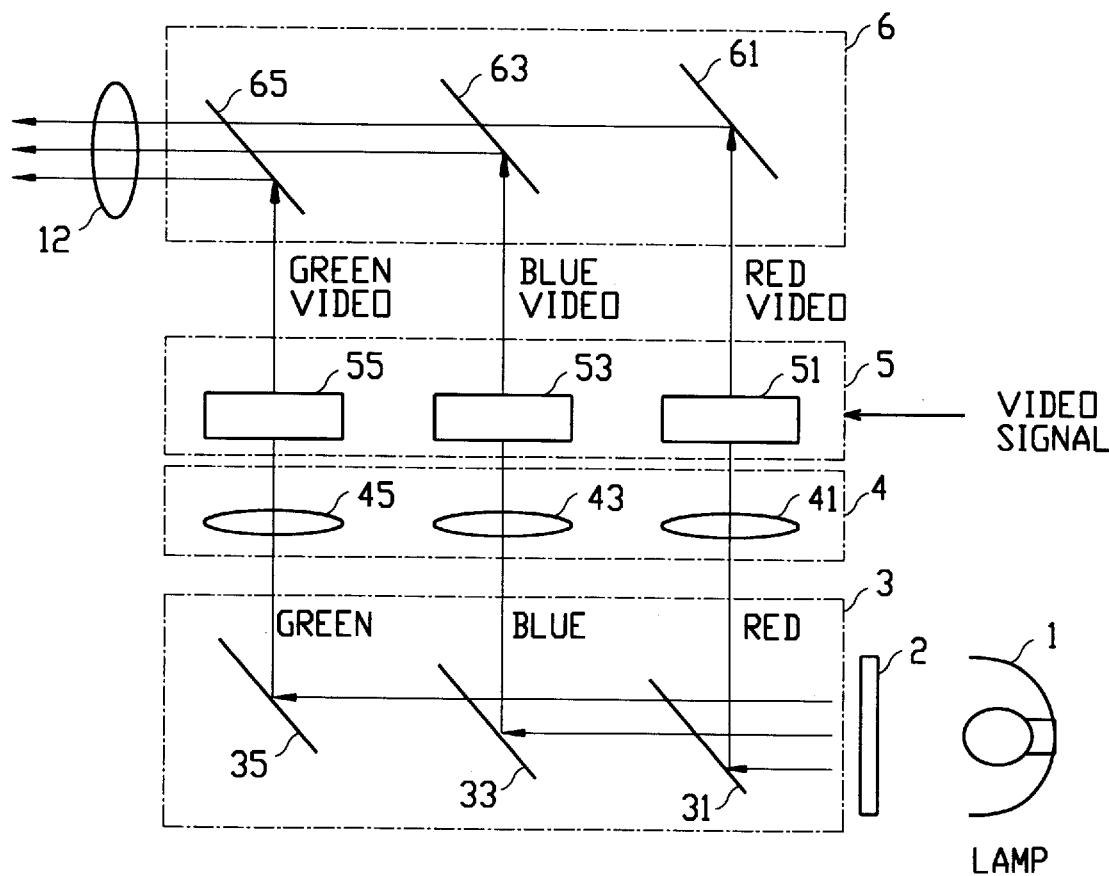
FIG. 1 is a block diagram view illustrating a prior art liquid crystal projector using a black and white liquid crystal display (LCD)
Figure 2:
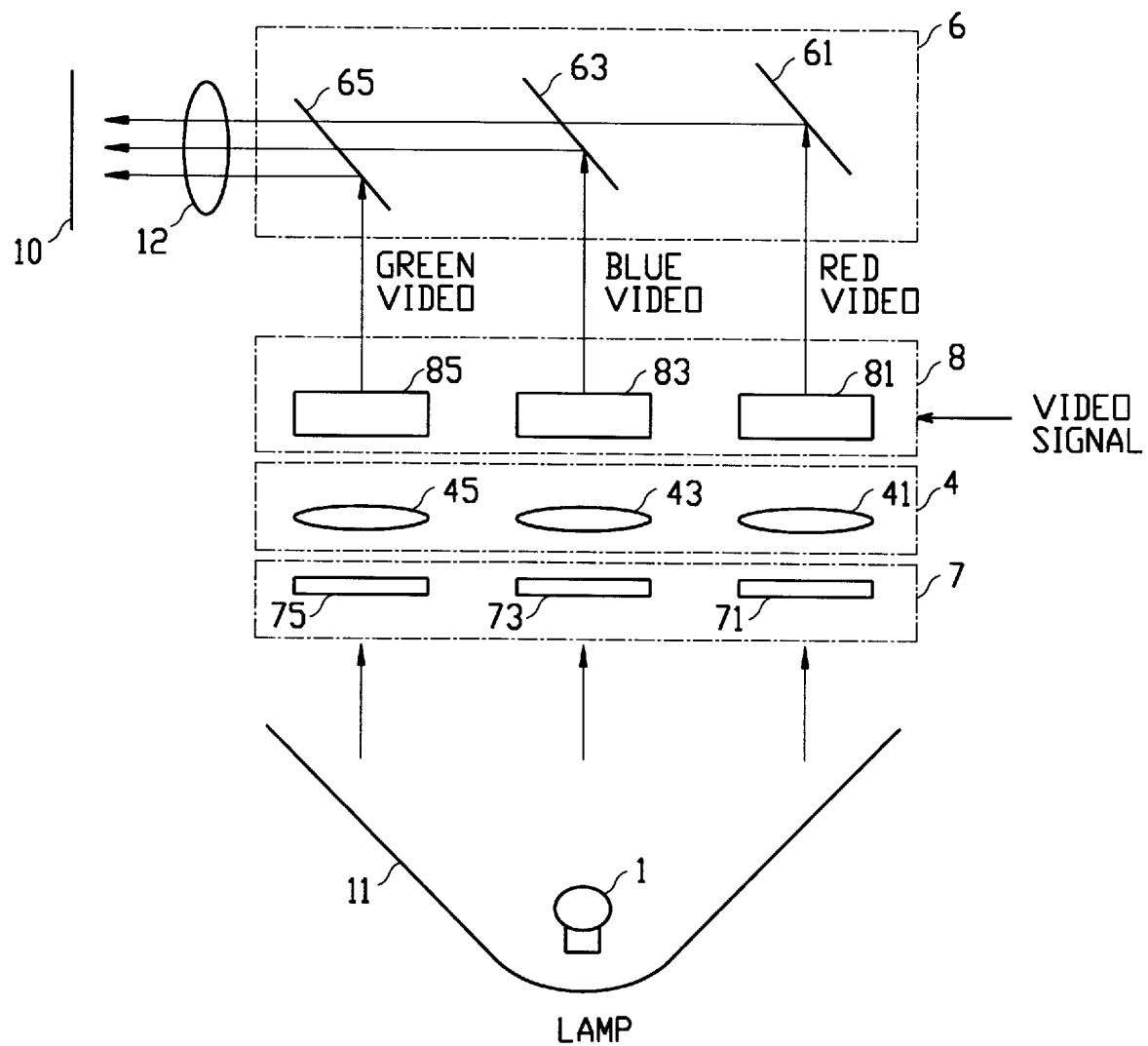
FIG. 2 is a view illustrating a liquid crystal projector using a monochromatic LCD in accordance with a first preferred embodiment of the present invention.

Embodiments of the present invention will now be described with reference to the accompanying drawings. FIG. 2 illustrates a liquid crystal projector using a monochromatic LCD in accordance with a preferred embodiment of the present invention. The liquid crystal projector includes a lamp 1 and a filter part 7 which filters the light of the lamp 1 and outputs a white light. A condenser lens group 4 then condenses and outputs three beams of white light. Only thereafter is the condensed white light separated into the three primary colors of light. Next, LCD part 8 outputs video images corresponding to the three primary colors of light separated according to a video signal applied to the LCD part 8. A reflective part 6 then combines the outputted video images and outputs the combined video image to a projector lens 12. Finally, the projector lens 12 will then project the combined video image onto a screen 10.

The lamp 1 further includes a reflective mirror 11 which is mounted at both sides of the lamp 1. The mirror 11 reflects the dispersed light and condenses the light into a predetermined region. The filter part 7 includes a first filter 71, a second filter 73 and a third filter 75. Each of the filters 71, 73 and 75 filters the light outputted from the lamp 1 and outputs a white light. In addition, the condenser lens group 4 further includes a first condenser lens 41, a second condenser lens 43, and a third condenser lens 45. Each of the three condenser lenses 41, 43, and 45 condenses the white light outputted from the corresponding one of the filters 71, 73, and 75.

The LCD part 8 uses LCDs that correspond to a particular color from the three primary colors of light. In other words, the LCD part 8 includes a red LCD 81 having monochrome LCD and a red color filter, a blue LCD 83 having a monochrome LCD and a blue color filter, and a green LCD 85 having a monochrome LCD and a green color filter. Each of the colors of the above color filters are among the three primary colors of the white and black LCD. Other configurations of monochromatic LCDs and color filters for processing white light from the condenser lens group 4 may be used, as will be apparent to those skilled in the art.

The reflective part 6 includes a first reflective mirror 61 for reflecting the red video image outputted from the red LCD 81. Also included is a first dichroic mirror 63 for reflecting the blue video image outputted from the blue LCD 82, and a second dichroic mirror 65 for reflecting the green video image outputted from the green LCD 83. The reflective part 6 outputs the combined color video to the projector lens 12.

The operation of the liquid crystal projector using a monochromatic LCD, in accordance with the first preferred embodiment of the present invention, will now be explained. When power is applied to drive the liquid crystal projector, infrared rays are filtered by the filter part 7 from the light emitted from the lamp 1. This filtered light is a white light and then becomes incident onto the condenser lens group 4. The white light from the first filter 71 is condensed onto the red LCD 81 by the first condenser lens 41. The red LCD 81 then outputs only the red video image from the condensed white light by modulating the light according to the applied video signal. In addition, the white light from the second filter 73 is condensed onto the blue LCD 83 by the second condenser lens 43. The blue LCD 83 then outputs only the blue video image from the condensed white light by modulating the light according to the applied video signal. Similarly, the white light from the third filter 75 is condensed onto the green LCD 85 by the third condenser lens 45. The green LCD 85 then outputs the green video image from the condensed white light by modulating the light according to the applied video signal.

The video images separated by the LCD part 8 then become incident onto the second reflective part 6, and are combined to form the original color video image. The combined color video image is then projected by the projector lens 12 onto the screen 10. That is to say, the red video image outputted from the red LCD 81 is reflected by the reflective mirror 61 of the reflective part 6 and becomes incident onto the first dichroic mirror 63. The first dichroic mirror 63 transmits the red video image reflected by the reflective mirror 61 and also reflects the blue video image outputted from the blue LCD 83, thereby outputting the combined red and blue video image to the second dichroic mirror 65. The second dichroic mirror 65 transmits the combined red and blue video images outputted from the first dichroic mirror 63, and reflects the green video image outputted from the G LCD 55, thereby outputting the combined red, blue and green video images. Accordingly, the projector lens 12 projects the combined red, blue and green color video images onto the screen 10.

Figure 3:
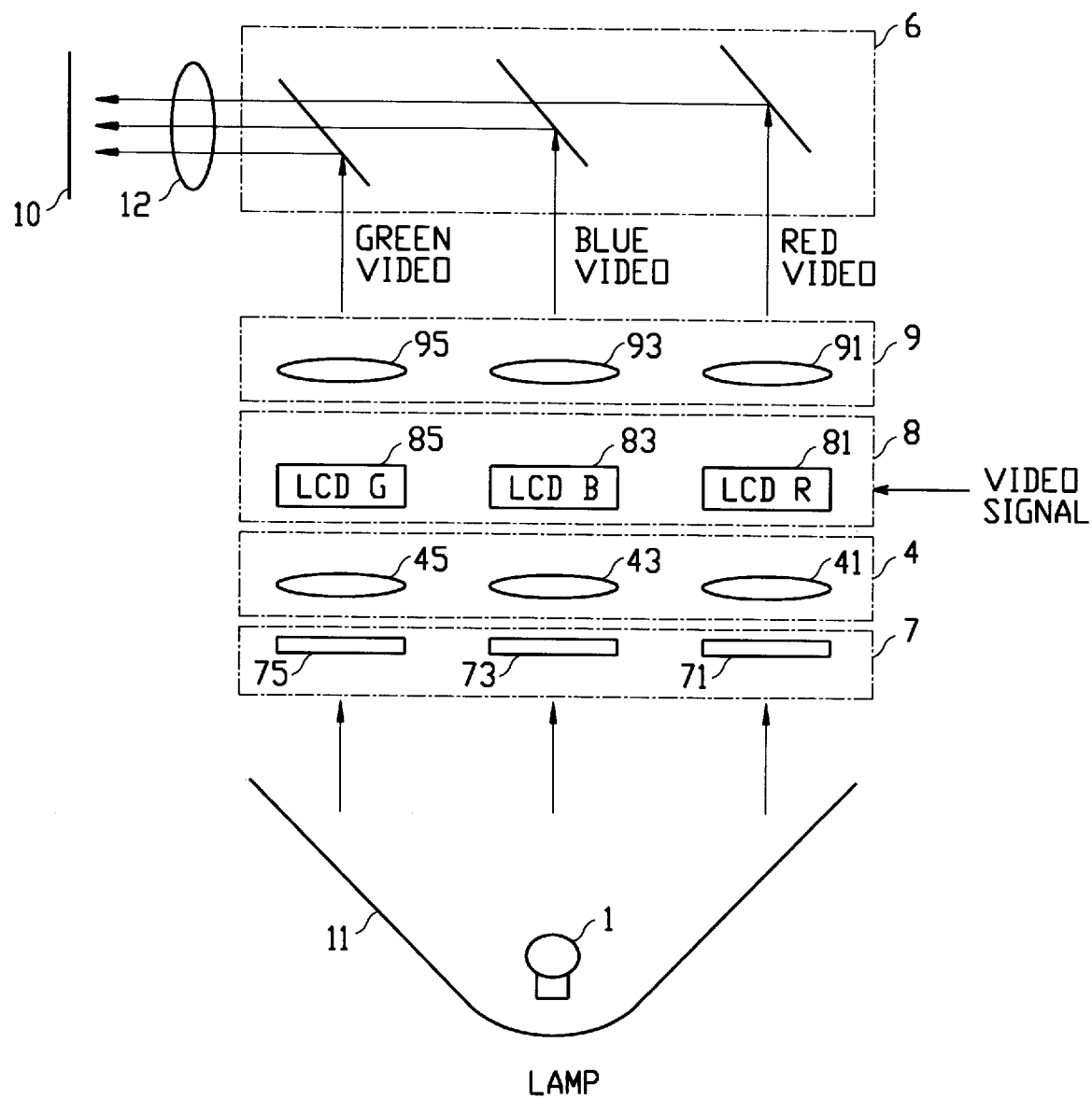
FIG. 3 is a view illustrating a liquid crystal projector using a monochromatic LCD in accordance with a second preferred embodiment of the present invention.

FIG. 3 illustrates a liquid crystal projector according to a second preferred embodiment of the invention. As shown in FIG. 3, a second condenser lens group 9 may be mounted at an output terminal of the LCD part 8 in order to enhance the screen quality of each video image outputted from the LCD part 8. The second condenser lens group 9 further includes a fourth condenser lens 91 for condensing the red video image outputted from the red LCD 81, a fifth condenser lens 93 for condensing the blue video image outputted from the blue LCD 83, and a sixth condenser lens 95 for condensing the green video image outputted from the green LCD 85. As a result, color video images having clear screen quality may be projected on the screen 10 by condensing the red, blue and green video images outputted from each of the LCDs 81, 83 and 85, and then outputting the video images to the reflective part 6.

As described above, the effect of the liquid crystal projector using a monochromatic LCD, in accordance with the preferred embodiments of the present invention, is that it can reduce the manufacturing cost and the size of the projector. In particular, this is accomplished by attaching the additional color filters which filter the white light into light components corresponding to the three primary colors of light of the black and white LCD. Therefore, the video images corresponding to each of the light components are reproduced using fewer expensive dichroic mirrors. In addition, color video images having clear screen quality may be obtained by mounting the additional condenser lenses on the LCD 8.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A liquid crystal projector comprising:
   a light source for outputting a light;
   a plurality of filter units for filtering the light outputted from the light source and for outputting a white light;
   a plurality of condenser units for condensing the white light outputted from a respective one of the plurality of filter units and for outputting a condensed white light;
   liquid crystal display (LCD) means comprising a plurality of monochromatic LCDs, each including a color filter for filtering the condensed white light, wherein the LCD means outputs video images by modulating the condensed white light outputted from the plurality of condenser units according to a video signal applied to the LCD means;
   a combining unit for combining each video image outputted from the LCD means and for outputting a combined color video image; and
   projecting means for projecting the combined color video image outputted from the combining unit onto a screen.

2. The projector of claim 1, wherein the LCD means comprises three monochromatic LCDs each including a color filter corresponding to one of the three primary colors of light.

3. The projector of claim 2, wherein the plurality of filter units includes a first filter, a second filter, and a third filter, each for filtering the light outputted from the light source and for outputting the white light.

4. The projector of claim 3, wherein the plurality of condenser units includes a first condenser lens for condensing the white light outputted from the first filter, a second condenser lens for condensing the white light outputted from the second filter, and a third condenser lens for condensing the white light outputted from the third filter.

5. The projector of claim 4, wherein the LCD means includes:
   a first monochromatic filter LCD, having one color filter consisting of a red color filter, for outputting a red video image by modulating the condensed white light outputted from the first condenser lens according to the applied video signal;
   a second monochromatic LCD, having one color filter consisting of a blues color filter, for outputting a blue video image by modulating the condensed white light outputted from the second condenser lens according to the applied video signal; and
   a third monochromatic LCD, having one color filter consisting of a green color filter, for outputting a green video image by modulating the condensed white light outputted from the third condenser lens according to the applied video signal.

6. The projector of claim 5, wherein the combining unit includes:
   a reflective mirror for reflecting the red video image outputted from the first LCD;
   a first dichroic mirror for transmitting the red video image reflected by the reflective mirror and for reflecting the blue video image outputted from the second LCD, thereby outputting a combined red and blue video image; and
   a second dichroic mirror for transmitting the combined red and blue video image outputted from the first dichroic mirror, and for reflecting the green video image outputted from the third LCD, thereby outputting a combined red, green and blue video image.

7. The projector of claim 1, wherein the projecting means comprises a projector lens for projecting onto the screen the combined color video image outputted from the reflective means.

8. The projector of claim 1, wherein the light source further includes a reflective mirror, mounted at two sides of the light source, for reflecting the light outputted from the light source and for condensing the light outputted from the light source into a predetermined region.

9. A liquid crystal projector comprising:

a light source for outputting a light;

a plurality of filter units for filtering the light outputted from the light source and for outputting a white light;

a plurality of first condenser units for condensing the white light outputted from a respective one of the plurality of filter units and for outputting a condensed white light;

liquid crystal display (LCD) means having red, green, and blue color filters for filtering the condensed white light and for outputting a red video image, a blue video image, and a green video image by modulating the condensed white light outputted from the plurality of condenser units according to a video signal applied to the LCD means;

a plurality of second condenser units for condensing the red video image, the blue video image and the green video image from the LCD means and for outputting respective condensed video images;

reflective means for combining the red, blue, and green condensed video images outputted from the plurality of second condenser units and for outputting a combined color video image; and projecting means for projecting the combined color video image outputted from the reflective means onto a screen.

10. The projector of claim 9, wherein the plurality of second condenser units includes:

a first condenser lens for condensing the red video image outputted from the LCD means;

a second condenser lens for condensing the blue video image outputted from the LCD means; and a third condenser lens for condensing the green video image outputted from the LCD means.

* * * * *

UNITED STATES PATENT AND TRADEMARK OFFICE
CERTIFICATE OF CORRECTION

PATENT NO. : 5,805,244
DATED : September 8, 1998
INVENTOR(S) : Inh-Seok SUH

It is certified that error appears in the above-indentified patent and that said Letters Patent is hereby corrected as shown below:

Title Page, Item [57], in the Abstract, line 7, "(color"should read --color--.

Title Page, Item [57], in the Abstract, line 10, "their" should read --then--.

Claim 5, col. 6, line 41, "blues" should read --blue--.

Signed and Sealed this

Twenty-second Day of June, 1999

*Attest:*

Q. TODD DICKINSON

*Attesting Officer*        Acting Commissioner of Patents and Trademarks